United States Patent
Ishiguri

(10) Patent No.: US 10,049,282 B2
(45) Date of Patent: Aug. 14, 2018

(54) TRAIN INTERIOR MONITORING METHOD AND TRAIN INTERIOR MONITORING SYSTEM

(71) Applicant: Mitsubishi Electric Corporation, Chiyoda-ku, Tokyo (JP)

(72) Inventor: Kenichi Ishiguri, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 389 days.

(21) Appl. No.: 14/909,944

(22) PCT Filed: Aug. 6, 2013

(86) PCT No.: PCT/JP2013/071245
§ 371 (c)(1),
(2) Date: Feb. 3, 2016

(87) PCT Pub. No.: WO2015/019415
PCT Pub. Date: Feb. 12, 2015

(65) Prior Publication Data
US 2016/0162739 A1 Jun. 9, 2016

(51) Int. Cl.
*H04N 5/76* (2006.01)
*H04N 5/225* (2006.01)
(Continued)

(52) U.S. Cl.
CPC ...... *G06K 9/00771* (2013.01); *B61L 15/0081* (2013.01); *B61L 99/00* (2013.01);
(Continued)

(58) Field of Classification Search
CPC ................ G07C 5/0866; G07C 5/0891; H04N 21/4334; H04N 21/42692; H04N 21/44;
(Continued)

(56) References Cited

U.S. PATENT DOCUMENTS 6,831,556 B1 12/2004 Boykin
8,350,907 B1 1/2013 Blanco et al.
(Continued)

FOREIGN PATENT DOCUMENTS

GB 2341290 A 3/2000
GB 2502922 A 12/2013
(Continued)

OTHER PUBLICATIONS

Office Action (Notice of Rejection) dated Sep. 6, 2016, by the Japanese Patent Office in corresponding apanese Patent Application No. 2015-530581 and English translation of the Office Action. (5 pages).

(Continued)

*Primary Examiner* — Nathnael Aynalem
(74) *Attorney, Agent, or Firm* — Buchanan Ingersoll & Rooney PC

(57) ABSTRACT

In a train interior monitoring method, in order to improve the efficiency in memory-usage, when an event occurs, data containing image information, which has been recorded in a temporary image memory, is recorded in an image memory without any processing in order to reduce the file size of the data. Further, data containing image information is recorded in the image memory represents for only a period of time before and after detection of the occurrence of the event, the period of time being set according to what the event is. After a given period of time has elapsed, the data containing the image information is processed in order to reduce its file size and then recorded in the image memory.

24 Claims, 6 Drawing Sheets

(51) Int. Cl.
  *G06K 9/00*  (2006.01)
  *G07C 5/08*  (2006.01)
  *B61L 15/00* (2006.01)
  *B61L 99/00* (2006.01)

(52) U.S. Cl.
  CPC ........... *G07C 5/0866* (2013.01); *H04N 5/225* (2013.01); *B61L 15/0036* (2013.01)

(58) Field of Classification Search
  CPC ......... H04N 21/44004; H04N 21/4435; H04N 5/76; G08B 13/19647; G08B 13/19676
  See application file for complete search history.

(56) References Cited

U.S. PATENT DOCUMENTS

| | | | | |
|---|---|---|---|---|
| 8,830,046 | B2* | 9/2014 | Yagi | B60R 1/00 340/436 |
| 2003/0067542 | A1 | 4/2003 | Monroe | |
| 2003/0081935 | A1 | 5/2003 | Kirmuss | |
| 2005/0046611 | A1* | 3/2005 | Safran | G08B 13/19669 342/195 |
| 2005/0168576 | A1* | 8/2005 | Tanahashi | G08B 13/19645 348/159 |
| 2008/0174675 | A1* | 7/2008 | Miki | H04N 5/772 348/231.2 |
| 2009/0051515 | A1* | 2/2009 | Fujinawa | B60R 1/00 340/436 |
| 2009/0086080 | A1 | 4/2009 | Suehiro et al. | |
| 2009/0222163 | A1 | 9/2009 | Plante | |
| 2010/0002080 | A1 | 1/2010 | Maki | |
| 2010/0100276 | A1* | 4/2010 | Fujinawa | G07C 5/0891 701/32.2 |
| 2010/0201819 | A1 | 8/2010 | Minowa | |
| 2011/0004789 | A1* | 1/2011 | Tsujimoto | G06F 11/1443 714/18 |

FOREIGN PATENT DOCUMENTS

| | | |
|---|---|---|
| JP | 09-081233 A | 3/1997 |
| JP | 2001-312238 A | 11/2001 |
| JP | 2004-056473 A | 2/2004 |
| JP | 2008-197893 A | 8/2008 |
| JP | 2009-032143 A | 2/2009 |
| JP | 2009-056921 A | 3/2009 |
| JP | 2009-088674 A | 4/2009 |
| JP | 2009-093548 A | 4/2009 |
| JP | 2010-035159 A | 2/2010 |
| JP | 2010-072787 A | 4/2010 |
| JP | 2011-065432 A | 3/2011 |
| JP | 2012-023556 A | 2/2012 |
| WO | 00/68951 A1 | 11/2000 |
| WO | WO 2012/137368 A1 | 10/2012 |

OTHER PUBLICATIONS

International Search Report (PCT/ISA/210) dated Oct. 15, 2013, by the Japanese Patent Office as the International Searching Authority for International Application No. PCT/JP2013/071245.

Written Opinion (PCT/ISA/237) dated Oct. 15, 2013, by the Japanese Patent Office as the International Searching Authority for International Application No. PCT/JP2013/071245.

Extended European Search Report dated Jun. 21, 2017, issued by the European Patent Office in corresponding European Application No. 13891275.3. (12 pages).

* cited by examiner

10,049,282 B2

TRAIN INTERIOR MONITORING METHOD AND TRAIN INTERIOR MONITORING SYSTEM

FIELD

The present invention relates to a train interior monitoring method and a train interior monitoring system.

BACKGROUND

The development of monitoring systems, which obtain and record image information when an event (e.g., an accident) occurs by using a monitoring camera or other devices, has advanced in recent years. It is thought that by using the monitoring system described above, if information, particularly from before the occurrence of an event, can be referenced, then investigating the cause of the event will be improved.

For example, Patent Literature 1 discloses a driving recorder that "includes a moving-image capturing unit that captures a moving image by using a camera incorporated in a mobile object; an image obtaining unit that obtains an image from the captured moving image in a predetermined sampling cycle; a specific-information obtaining unit that obtains information that is specific to the obtained image; a specific-information transmitting unit that transmits the obtained specific information to a predetermined server that gives a time stamp; an event detecting unit that detects the occurrence of an event; and a moving-image storing unit that has stored therein a moving image for at least a predetermined preceding recording time before the occurrence of an event when the event detecting unit detects the event". This driving recorder records image information in a data storage unit and, at the same time, it continuously updates the moving image obtained by recording for a predetermined period of time before the present time until the present time.

CITATION LIST

Patent Literature

Patent Literature 1: Japanese Patent Application Laid-open No. 2010-72787

SUMMARY

Technical Problem

However, in the above known technique, the obtained image information is directly saved without being processed. Therefore, there is a problem of low efficiency in memory-usages.

The present invention has been achieved to solve the above problems, and an objective of the present invention is to provide a train interior monitoring method that is capable of obtaining image information before and after the occurrence of an event with improved efficiency in memory-usage.

Solution to Problem

In order to solve the problem and achieve the objective mentioned above, the present invention relates to a train interior monitoring method for monitoring an interior of a train and recording information in a monitoring-information recording device that is provided with a temporary memory and a memory. The method includes: a step for obtaining image information by using a camera; a step for, by using the monitoring-information recording device, temporarily recording data containing the image information from the camera in the temporary memory; a step for, by using the monitoring-information recording device when an event occurs, recording, for a period of time before and after detection of the event, the data containing the image information which has already been recorded in the temporary memory, in the memory without processing in order to reduce a file size of the data containing the image information, the period of time being set according to what the event is; a step for, by using the monitoring-information recording device, processing the data containing the image information, which has been recorded in the temporary memory, in order to reduce the file size of the data containing the image information, and recording the processed data in the memory after a given period of time has elapsed; and a step for, by using the monitoring-information recording device, discarding the data containing the image information held in the temporary memory.

Advantageous Effects of Invention

According to the present invention, it is possible to provide a train interior monitoring method that is capable of obtaining image information before and after the occurrence of an event with improved efficiency in memory-usage.

DESCRIPTION OF EMBODIMENTS

Exemplary embodiments of a train interior monitoring method and a train interior monitoring system according to the present invention will be explained below in detail with reference to the accompanying drawings. The present invention is not limited to these embodiments.

First Embodiment

Figure 1:
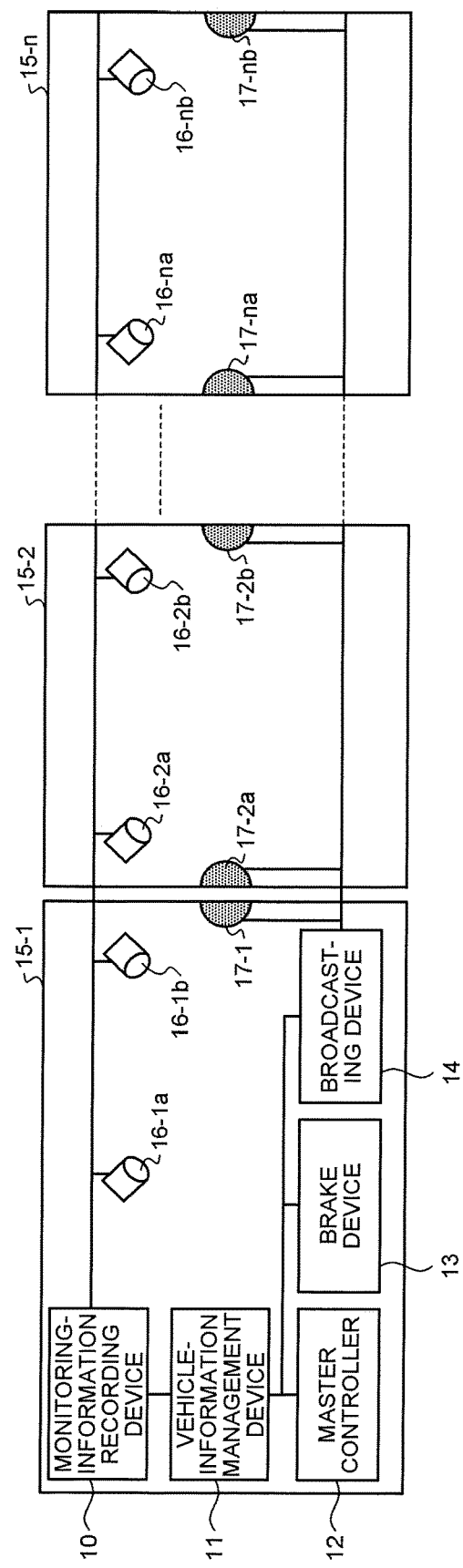
FIG. 1 is a diagram illustrating a train that is capable of executing a train interior monitoring method according to a first embodiment.

FIG. 1 is a diagram illustrating a train that is capable of executing a train interior monitoring method according to a first embodiment of the present invention. The train illustrated in FIG. 1 is an n-vehicle train (n is a natural number) in which n vehicles 15-1 to 15-n are connected to each other. The vehicle 15-1, which is the leading vehicle, includes a monitoring-information recording device 10, a vehicle-information management device 11, a master controller 12, a brake device 13, a broadcasting device 14, monitoring cameras 16-1a and 16-1b, and an emergency alerting device 17-1. The vehicle 15-2 includes monitoring cameras 16-2a and 16-2b and emergency alerting devices 17-2a and 17-2b. All the vehicles except for the vehicle 15-1 have a configuration identical to the vehicle 15-2. The vehicle 15-n includes monitoring cameras 16-na and 16-nb and emergency alerting devices 17-na and 17-nb.

The monitoring-information recording device 10 is a device that records image information obtained in the interior of the vehicles by using the monitoring cameras 16-1a, 16-1b, 16-2a, 16-2b, 16-na, and 16-nb (hereinafter, collectively referred to as "monitoring camera 16").

Figure 2:
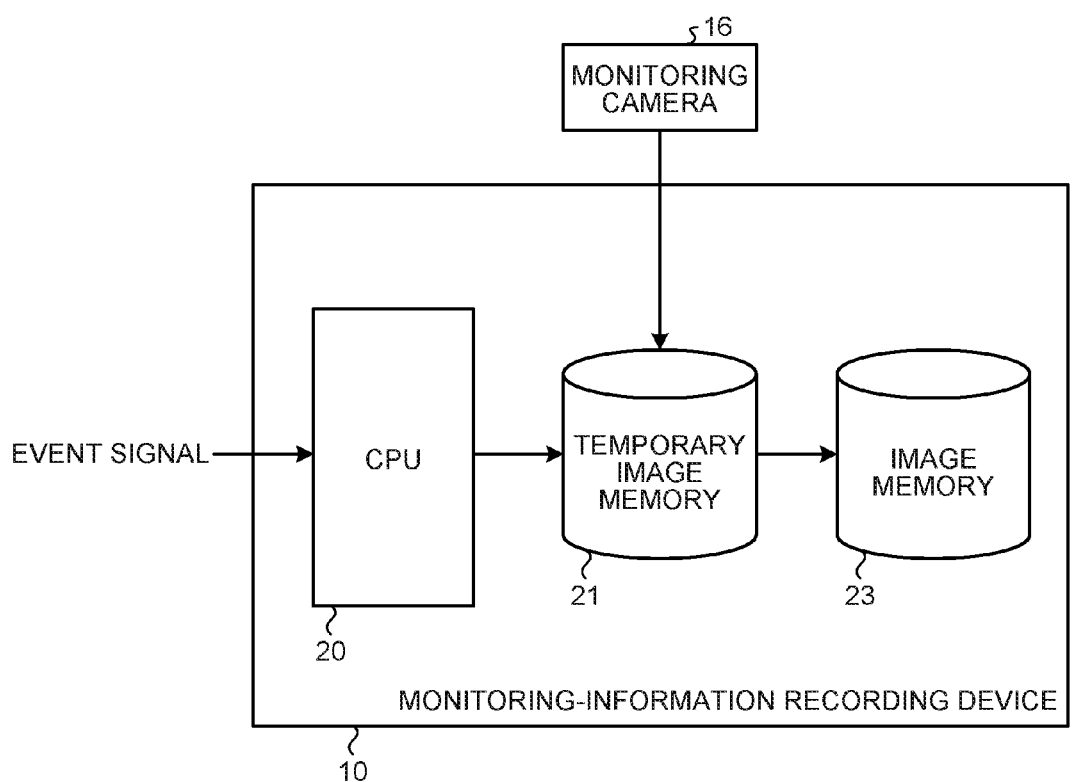
FIG. 2 is a diagram illustrating a configuration of a monitoring-information recording device in a train interior monitoring system according to the first embodiment.

FIG. 2 is a diagram illustrating a configuration of the monitoring-information recording device 10. The monitoring-information recording device 10 includes a CPU 20, a temporary image memory 21, and an image memory 23.

In the n-vehicle train illustrated in FIG. 1, the vehicle-information management device 11 collectively manages acceleration and braking of each vehicle, inspection before departure, in-vehicle air-conditioning, and various in-vehicle devices such as a destination display device and an in-vehicle guide display device. The master controller 12 is provided in the driver's cab, and it remotely controls the speed of the railway vehicles. The brake device 13 decelerates the railway vehicles. The broadcasting device 14 is connected to the emergency alerting devices 17-1, 17-2a, 17-2b, 17-na, and 17-nb (hereinafter, collectively referred to as "emergency alerting device 17") in their respective vehicles. The broadcasting device 14 makes it possible to tele-communicate between these emergency alerting devices and the driver's cabin (the driving seat).

The monitoring camera 16 obtains image information. The image information refers to visually-recognizable information. The image information includes moving images and still images. The monitoring camera 16 is provided at a position where it is capable of monitoring the interior of the vehicle. A plurality of monitoring cameras 16 are provided as needed. In order to monitor irregular door opening/closing, the monitoring camera 16 can be located near the door, or it can be located in the driver's cabin. The monitoring cameras 16 are all connected to the monitoring-information recording device 10. Image information obtained by the monitoring cameras 16 is all transmitted to the monitoring-information recording device 10. A procedure for transmitting the image information obtained by the monitoring camera 16 to the monitoring-information recording device 10 is described below with reference to FIG. 3.

Figure 3:
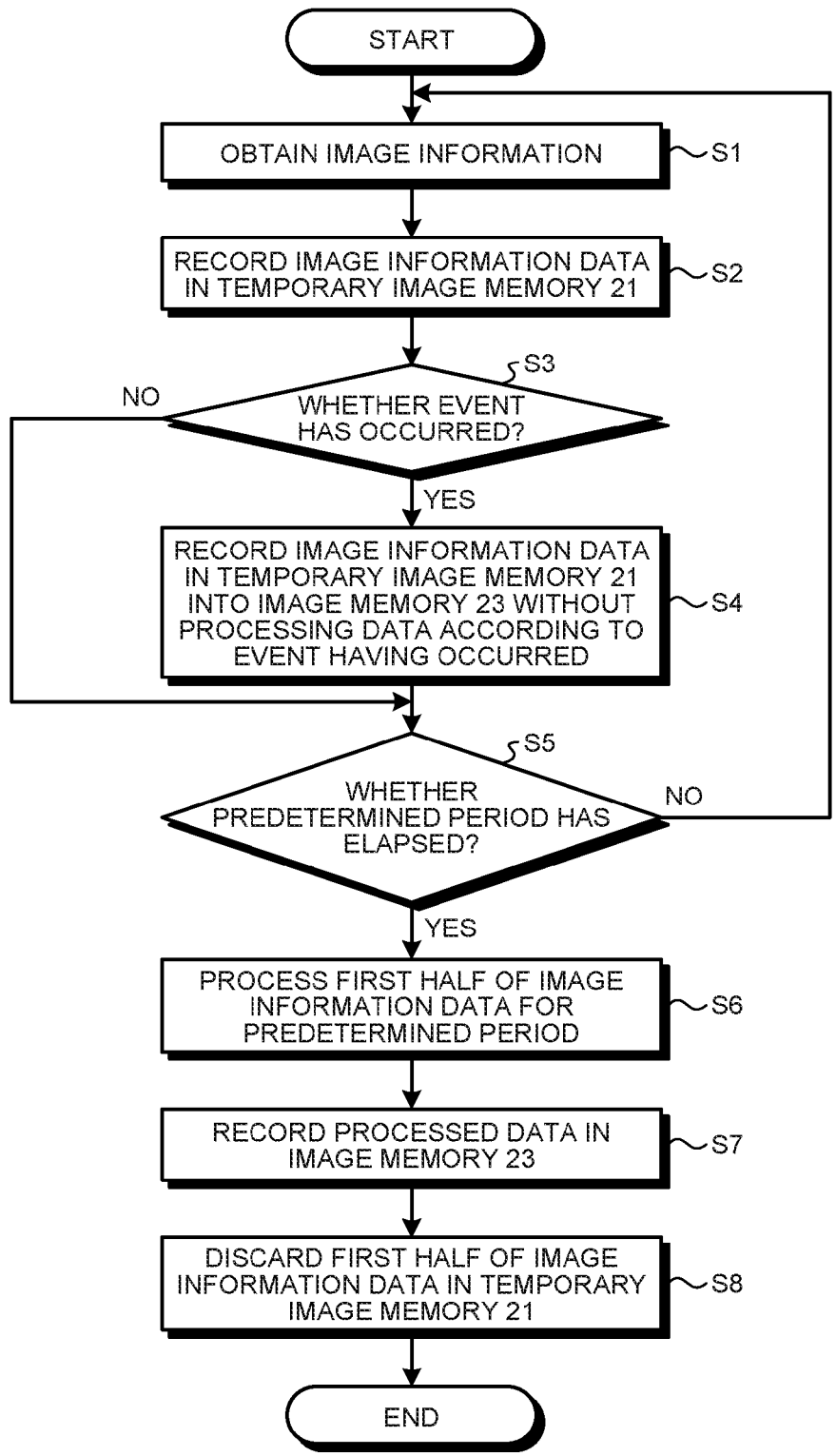
FIG. 3 is a flowchart explaining a procedure for transmitting image information obtained by a monitoring camera to the monitoring-information recording device in accordance with the train interior monitoring method according to the first embodiment.

FIG. 3 is a flowchart explaining a procedure for transmitting image information obtained by the monitoring camera 16 to the monitoring-information recording device 10. First, the monitoring camera 16 obtains image information (Step S1).

Data containing the obtained image information is temporarily recorded in the temporary image memory 21 in the monitoring-information recording device 10 (Step S2). At this time, the data is recorded in the temporary image memory 21 in a format in which the data includes more information. For example, when image information is a still image, it is recorded at a high resolution. When image information is a moving image, it is recorded at a high resolution and a high frame rate. Thereafter, it is determined whether an event has occurred (Step S3).

When an event is detected (YES branch, at Step S3), the monitoring-information recording device 10 records data containing image information in the temporary image memory 21 in the image memory 23 without processing that is in order to reduce file size of the data for a recording period before and after the event. The recording period is set according to the type of event (Step S4). That is, the monitoring-information recording device 10 records, in the image memory 23 without processing the data, data containing image information that has been recorded in the temporary image memory 21 for a predetermined period of time preceding the point in time when the event was detected (i.e., data before the occurrence of an event), and it records data containing image information that was obtained from the point in time when the event was detected until a predetermined period of time has elapsed (i.e., data after the occurrence of the event).

The processing to reduce the file size is performed by reducing resolutions or compressing by using a high-compression-rate method. For another example, in a case where image information is a moving image, the information is converted into a low-frame-rate moving image. Further, it is possible that data containing image information that is a moving image is recorded in the temporary image memory 21, and data containing image information that is a still image is recorded in the image memory 23. Furthermore, it is possible that when image information is a still image, then when still images are recorded in the image memory 23, a portion of the data is deleted at given intervals. For example, when still images are recorded in the image memory 23, it is possible that only one out of two still images that have been recorded in the temporary image memory 21 is recorded in the image memory 23.

Next, regardless of whether an event is detected, it is determined whether a predetermined period of time has elapsed (Step S5).

The "predetermined period of time" is a period of time that is long enough to accumulate image information in the temporary image memory 21 and that occupies a half of the recording space of the temporary image memory 21. For example, the "predetermined period of time" may be set approximately twice as long as the maximum "period of time for recording image information that is to be held in the temporary image memory 21 in the image memory 23 without processing the data" when an event occurs.

When the predetermined period of time has not yet elapsed (NO branch, at Step S5), the processing returns to Step S1, and the monitoring camera 16 continues to obtain image information. When the predetermined period of time has elapsed (YES branch, at Step S5), the monitoring-information recording device 10 processes the first half of the data containing image information recorded in the temporary image memory 21 so as to reduce the file size (Step S6), then records the processed data in the image memory 23 (Step S7), and discards a portion of the data containing image information from the temporary image memory 21, which has been processed and recorded in the image memory 23 (Step S8). Before and after an event, data that has been processed to reduce its file size and then recorded in the image memory 23 and data that has been recorded in the image memory 23 without being processed are both present simultaneously. The data that has been processed to reduce its file size may be deleted.

As described above, at Step S6, the processing to reduce the file size is performed on only the first half of the data containing image information recorded in the temporary image memory 21. The reason for this is as follows: Assuming that at Step S6, all data containing image information recorded in the temporary image memory 21 is collectively and simultaneously processed and discarded, when the processing is restarted to start obtaining image information (Step S1) and an event occurs immediately after the restart, then the data containing image information, which has been recorded in the temporary image memory 21 before the occurrence of an event, has already been discarded. Therefore, unprocessed data containing image information before the occurrence of an event cannot be saved in the image memory 23. As described above, the processing to reduce the file size is performed only on the first half of the data containing image information recorded in the temporary image memory 21. This makes it possible to save unprocessed data containing image information in the image memory 23 even when an event has occurred immediately after the processing is restarted.

A case will be explained here by illustrating a specific example in which only the first half of the data containing image information is recorded during a predetermined period of time. Here, the recordable time for the temporary image memory 21 is 20 minutes. The predetermined period is set to 10 minutes. After the predetermined period of time has elapsed (that is, after 10 minutes), data containing image information for 5 minutes from the start of the processing (0 to 5 minutes after the start) is processed (Step S6). The processed data for 5 minutes from the start of the processing is recorded in the image memory 23 (Step S7), and then the processed data for 5 minutes stored in the temporary image memory 21 is discarded (Step S8). Thereafter, the processing is again restarted for obtaining image information (Step S1). If no event occurs (NO branch, at Step S3), and after the predetermined period from the restart of the processing has elapsed (after 10 minutes from the restart of the processing, i.e., after 20 minutes from the initial start of the processing), data containing image information is processed from the restart of the processing for 5 minutes (i.e., 5 to 15 minutes from the initial start of the processing) (Step S6). The 10-minute processed data is recorded in the image memory 23 (Step S7), and the processed 10 minutes of data stored in the temporary image memory 21 is discarded (Step S8).

With the operation as described above, when the processing is restarted to start obtaining image information (Step S1), the 5-minute second half of the data remains in the temporary image memory 21. Therefore, even when an event has occurred immediately after the start of obtaining image information, unprocessed data of the approximately preceding 5 minutes from the occurrence of the event can still be stored.

Data containing image information may be recorded in the image memory 23 without simultaneously keeping both of recorded data that has been processed to reduce its file size and of unprocessed recorded data. When these pieces of data are not simultaneously kept, the efficiency in memory-usage of the image memory 23 is further improved. When these pieces of data are not simultaneously kept, for example, the configuration may be such that, when detecting an event, measurement of the "predetermined period of time" at Step S5 is stopped; after the recording period of time before and after the occurrence of an event has elapsed, data recorded in the image memory 23 is deleted from the temporary image memory 21; and thereafter measurement of the "predetermined period of time" at Step S5 is restarted.

For example, when the "predetermined period of time" at Step S5 is set to 10 minutes, at a point in time of 4 minutes from the start, and an "event in which unprocessed data is recorded for 3 minutes before and after the occurrence" has occurred, then measurement for the "predetermined period of time" is stopped at a point 4 minutes from the start. Data recorded in the temporary image memory 21 for 3 minutes before the occurrence and data obtained for 3 minutes after the occurrence are recorded in the image memory 23. At the point in time when recording the data in the image memory 23 is finished, the data which corresponds to the recorded data in the image memory 23 is discarded from the temporary image memory 21. Measurement of the time, which has been stopped at the point in time of 4 minutes, is then restarted from that time point; and when the elapsed time reaches 10 minutes, the operation shifts to Step S6.

As described above, only when the occurrence of an event is detected, the information is directly recorded in the image memory 23 without being compressed or the like. Therefore, a larger volume of (high-frame-rate or high-resolution) image information data is recorded before and after the event. Also, a smaller volume of (low-frame-rate or low-resolution) image information data is recorded when no event occurs. Accordingly, before and after an event, more detailed information is obtained; whereas, when no event occurs, the memory usage can be suppressed, which in turn increases the efficiency of the memory-usage.

An event is detected by transmitting a signal that indicates the occurrence of an event (an event signal) to the CPU 20. The event signal may be, for example, transmitted from the vehicle-information management device 11 to the monitoring-information recording device 10. This is because the vehicle-information management device 11 gathers information regarding train speed, change in notch, braking (including emergency braking), emergency alert, and irregular door opening/closing. Further, information regarding the emergency brake may be transmitted from the brake device 13 to the monitoring-information recording device 10. Furthermore, information regarding an emergency alert may be transmitted from the broadcasting device 14 to the monitoring-information recording device 10.

Examples of irregular door opening/closing include door opening while the train is moving and the door being open at a location other than a station during an evacuation or the like.

Figure 4:
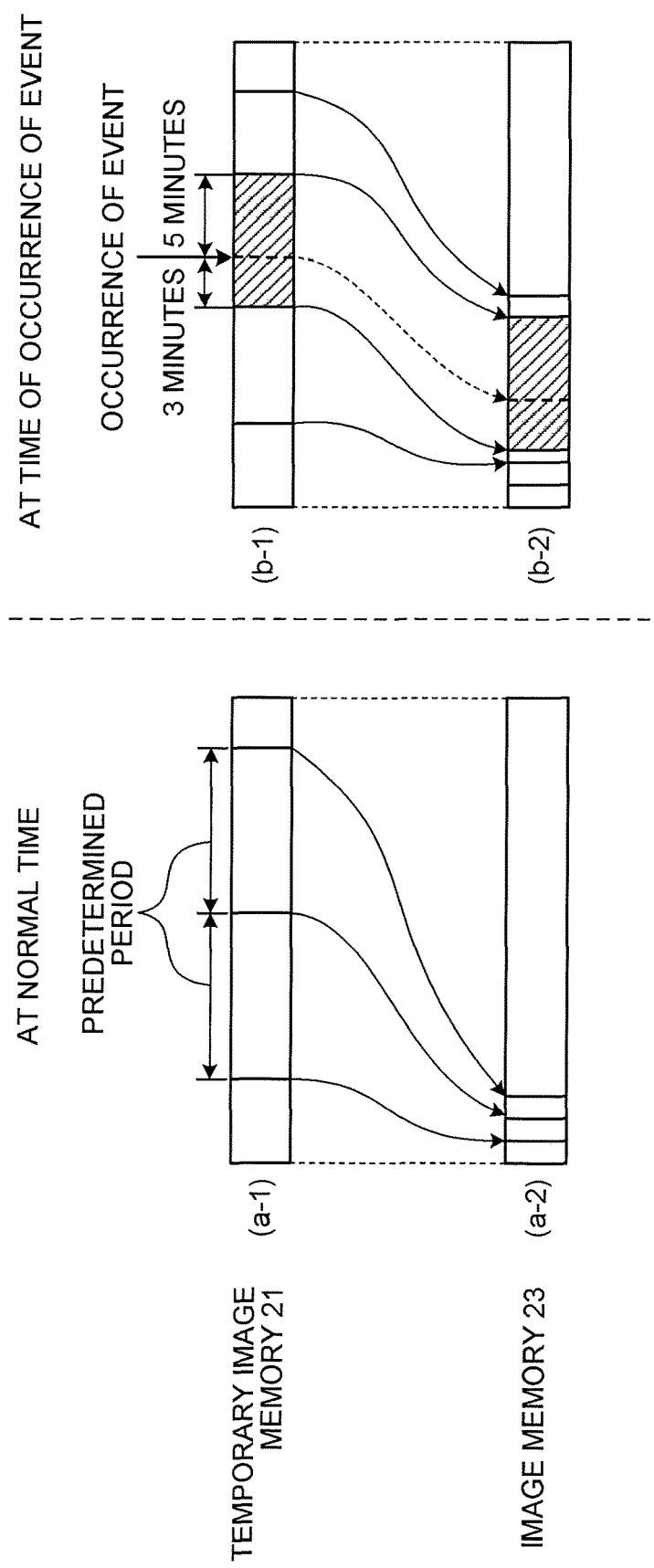
FIG. 4 is a diagram illustrating the structure of data recorded in a temporary image memory and the structure of data in an image memory in accordance with the train interior monitoring method according to the first embodiment when no event occurs and when an event occurs.

FIG. 4 is a diagram illustrating the data structure example of data to be recorded in the temporary image memory 21 and also of data to be saved in the image memory 23 both at a normal time (i.e., when no event occurs) and at a time when an event occurs. (a-1) in FIG. 4 illustrates data to be recorded in the temporary image memory 21 at the normal time. (a-2) in FIG. 4 illustrates data to be saved in the image memory 23 at the normal time. (b-1) in FIG. 4 illustrates data to be recorded in the temporary image memory 21 when an event occurs. (b-2) in FIG. 4 illustrates data to be saved in the image memory 23 when an event occurs.

As illustrated in (a-1) and (a-2) in FIG. 4, at the normal time, moving-image data recorded in the temporary image memory 21 is processed in order to reduce its file size, and then it is recorded in the image memory 23. When an event is detected, as illustrated in (b-1) and (b-2) in FIG. 4, for a predetermined period of time before and after the occurrence of the (emergency) event, moving-image data recorded in the temporary image memory 21 is directly recorded in the image memory 23 without reducing its frame rate. A period of "t" seconds, during which the moving-image data is directly recorded in the image memory 23 without reducing its frame rate, is decided according to the type of event. When an event such as "emergency alert button is pressed"

occurs, the recording period may be set to 3 minutes before the occurrence of the event, and it may be set to 5 minutes after the occurrence of the event, for example, in order to identify the cause of the emergency alert button being pressed and in order to identify who has pressed the emergency alert button. Further, when an event such as "emergency brake application" occurs, only 1 minute after the occurrence of the event may be set as a recording period of time, for example.

The train interior monitoring method of the present embodiment described above is a train interior monitoring method for monitoring an interior of a train and recording information in a monitoring-information recording device provided with a temporary memory and a memory. The method includes a step for obtaining image information by a camera; a step for, by using the monitoring-information recording device, temporarily recording data containing the image information from the camera in the temporary memory; a step for, by using the monitoring-information recording device when an event occurs, recording data containing the image information that has been recorded in the temporary memory in the memory without processing that is in order to reduce the file size for only a period of time, which is set according to the event, before and after detection of the event; a step for, by using the monitoring-information recording device, processing data containing the image information that has been recorded in the temporary memory in order to reduce its file size and recording the processed data in the memory after a given period of time has elapsed; and a step for, by using the monitoring-information recording device, discarding data containing the image information in the temporary memory.

In order to execute the train interior monitoring method described above, the CPU 20 may execute a program in order to perform the train interior monitoring method described above.

Further, a train interior monitoring system may be configured to use the train interior monitoring method described above. The train interior monitoring system of the present invention is a train interior monitoring system that includes a camera that monitors an interior of a train and obtains image information; and a monitoring-information recording device that includes a temporary memory in which the image information is temporarily recorded and a memory in which a portion of data in the temporary memory is saved. After a given period of time has elapsed, the monitoring-information recording device processes data containing the image information, which has been recorded in the temporary memory, in order to reduce its file size and records the processed data in the memory; and when an event occurs, the monitoring-information recording device records data containing the image information, which has been recorded in the temporary memory, in the memory without processing the data for only a period of time, which is set according to the event, before and after the detection of the event. The data containing the image information in the temporary memory is discarded after having been recorded in the memory.

As described above, according to the train interior monitoring method or the train interior monitoring system of the present embodiment, a train interior monitoring system can be obtained that is capable of obtaining image information before and after the occurrence of an event and that increases the efficiency of memory-usage.

Second Embodiment

While in the first embodiment, there has been described a case where only image information is obtained, the present invention is not limited thereto. In a second embodiment of the present invention, a case is described where audio information is obtained along with image information. In the following descriptions, constituent elements identical to those in the first embodiment are denoted by like reference signs.

Figure 5:
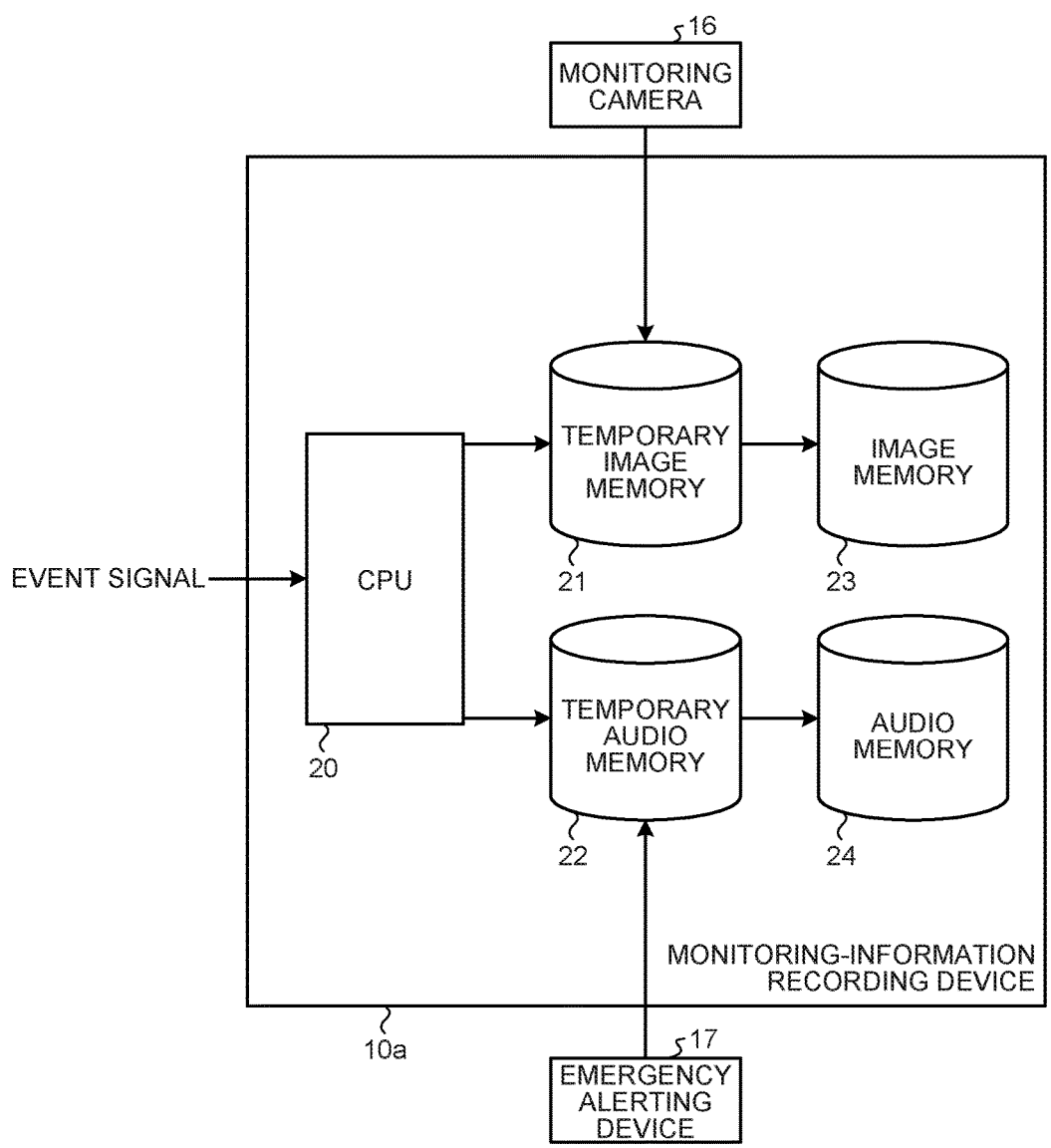
FIG. 5 is a diagram illustrating a configuration of a monitoring-information recording device in a train interior monitoring system according to a second embodiment.

FIG. 5 is a diagram illustrating a monitoring-information recording device 10a according to the present embodiment. The monitoring-information recording device 10a includes the CPU 20, the temporary image memory 21, the image memory 23, a temporary audio memory 22, and an audio memory 24. The monitoring-information recording device 10a is different from the monitoring-information recording device 10 according to the first embodiment in that the monitoring-information recording device 10a includes the temporary audio memory 22 and the audio memory 24. The monitoring camera 16 is connected to the temporary image memory 21. The emergency alerting device 17 is connected to the temporary audio memory 22.

While FIG. 5 illustrates an example using a microphone provided in the emergency alerting device 17, an additional microphone can be provided separately from the microphone in the emergency alerting device 17.

Both data containing image information obtained by the monitoring camera 16 and data containing audio information obtained by the microphone are added with a time (or a time stamp), an event ID, and other information; of which configuration is able to synchronize the image information with the audio information.

Figure 6:
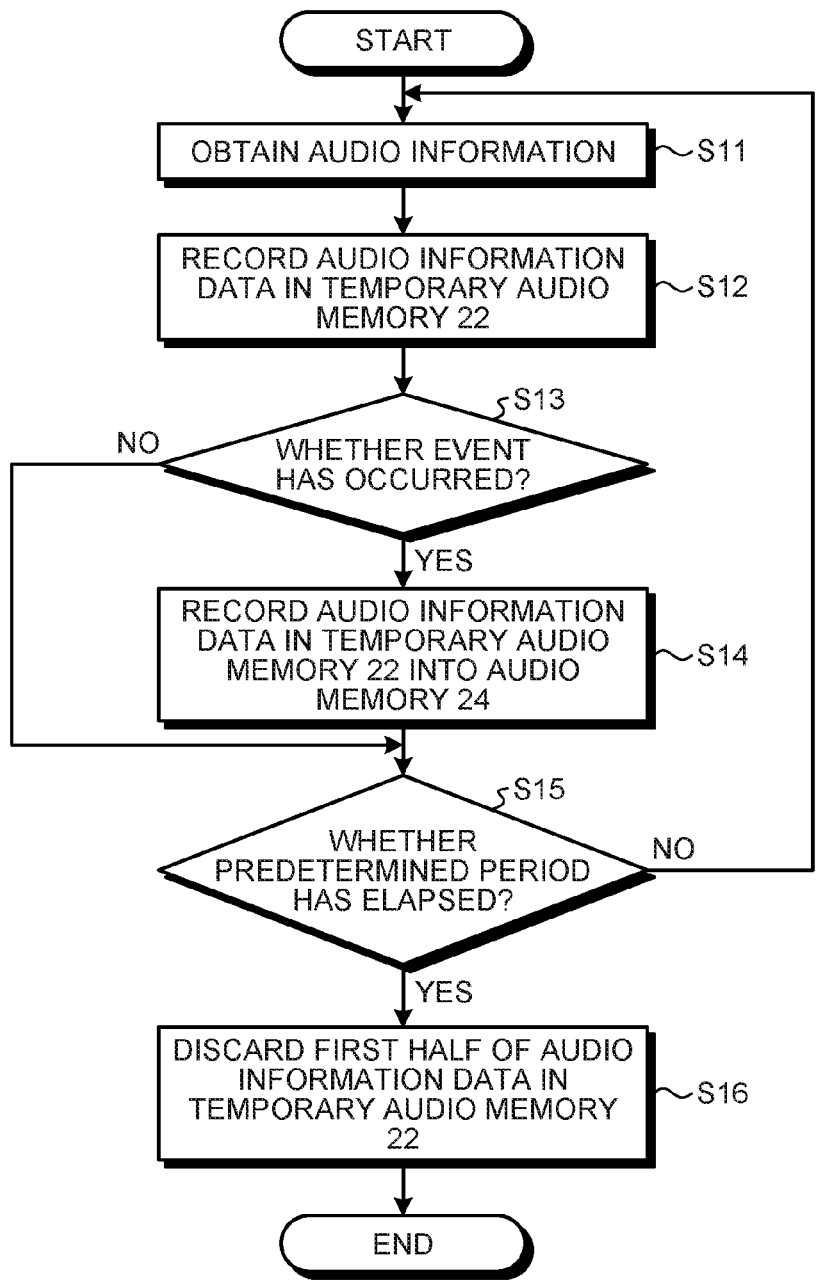
FIG. 6 is a flowchart explaining a procedure for transmitting audio information obtained by a microphone to a monitoring-information recording device in accordance with a train interior monitoring method according to the second embodiment.

FIG. 6 is a flowchart explaining a procedure for transmitting audio information obtained by the microphone provided in the emergency alerting device 17 to the monitoring-information recording device 10a. First, the microphone obtains audio information (Step S11).

The obtained audio information is temporarily held in the temporary audio memory 22 of the monitoring-information recording device 10a (Step S12). Thereafter, it is determined whether an event has occurred (Step S13).

When the occurrence of an event is detected (YES branch, at Step S13), during a period before and after the occurrence of an event, which is set according to the type of event, the monitoring-information recording device 10a records data containing audio information, which has been recorded in the temporary audio memory 22 in a predetermined preceding period from the point in time when the occurrence of an event is detected (data before the occurrence of an event); and it records data containing audio information, which is to be obtained from the point in time when the occurrence of an event is detected to a lapse of a predetermined period (data after the occurrence of an event), in the audio memory 24 (Step S14).

Next, regardless of whether the occurrence of an event is detected, it is determined whether a predetermined period has elapsed (Step S15). The "predetermined period" is a period that is long enough to accumulate audio information in the temporary audio memory 22, which occupies a half of the recording space of the temporary audio memory 22. This "predetermined period" may be equal to the "predetermined period" at the step for recording image information in the first embodiment.

When the predetermined period has not yet elapsed (NO branch, at Step S15), the processing returns to Step S11, and the microphone continues to obtain audio information. When the predetermined period has elapsed (YES branch, at Step S15), the monitoring-information recording device 10a discards the first half of the data containing audio information in the temporary audio memory 22 regardless of whether an event has occurred (Step S16).

Measurement of the "predetermined period" at Step S15 may be either stopped or not stopped when an event occurs.

As described above, at Step S16, the first half of the data is discarded from the temporary audio memory 22 and the second half of the data is not discarded. The reason for this is as follows. Assuming that at Step S16, all data containing audio information recorded in the temporary audio memory 22 is collectively and simultaneously processed and discarded, and when the processing is restarted to obtain audio information (Step S11) and an event has occurred immediately after the restart, then the data containing audio information, which has been recorded in the temporary audio memory 22 before the occurrence of an event, is already discarded. Therefore, data that contains audio information before the occurrence of an event cannot be saved in the audio memory 24. As described above, at the lapse of a predetermined period, the first half of the data containing audio information recorded in the temporary audio memory 22 is discarded; while the second half of the data remains. Therefore, even when an event occurs immediately after the processing has been restarted, it is still possible to save the data that contains audio information in the audio memory 24.

The case is explained by illustrating a specific example in which the first half of the data containing audio information is discarded at the lapse of a predetermined period. Given that a recordable time for the temporary audio memory 22 is 20 minutes and the predetermined period is set to 10 minutes. After a lapse of the predetermined period (that is, after a lapse of 10 minutes), data containing audio information in the temporary audio memory 22 for 5 minutes from the start of the processing (0 to 5 minutes after the start) is discarded (Step S16). Thereafter, the processing is restarted to start obtaining audio information (Step S11). When no event has occurred (NO branch, at Step S13) and after the predetermined period lapses from the restart of the processing (after a lapse of 10 minutes from the restart of the processing, that is, after a lapse of 20 minutes from the initial start of the processing), data from the restart of the processing to a lapse of 5 minutes (that is, 5 to 15 minutes after the initial start of the processing) is discarded (Step S16).

Operated as described above, when the processing is restarted to start obtaining audio information (Step S11), the 5-minute second half of the data remains in the temporary audio memory 22. Therefore, even when an event has occurred immediately after the start of obtaining audio information, data containing audio information approximately in the preceding 5 minutes from the occurrence of the event can still be stored.

As described as above, audio information can be recorded in the monitoring-information recording device 10a. The audio information saved in the audio memory 24 is added with time information, an event ID, and other information. Therefore, this audio information can be synchronized with image information obtained by the monitoring camera 16; and then they can be recorded in the image memory 23 according to the procedure illustrated in FIG. 3. It is possible that the image memory 23 and the audio memory 24 are provided in separate areas in the same storing device, or they are provided individually in separate storing devices.

As described above, both image information and audio information are obtained; and the obtained image information and audio information can be synchronized with each other.

In the train interior monitoring method of the present invention, the image-information recording period and other conditions are varied according to the type of event. Table 1 illustrates examples of specific events, recording period, whether to obtain recorded audio data, and monitoring target vehicles.

TABLE 1

| Specific events | Recording time | | Recorded audio data | Target vehicle |
|---|---|---|---|---|
| | Before event occurrence | After event occurrence | | |
| Door is opened during train movement | 30 seconds | 30 seconds | — | All vehicles |
| Emergency alert button is pressed | 3 minutes | 5 minutes | Obtain | Applicable vehicle only |
| Emergency brake is applied | 0 minute | 1 minute | — | All vehicles |

As the first example, when an event such as "door is opened during train movement" is detected, all vehicles are monitoring target vehicles; and recorded audio data is unnecessary. Therefore, image information recorded in the temporary image memory 21 for 30 seconds before the occurrence of an event and for 30 seconds after the occurrence of an event is recorded in the image memory 23.

As the second example, when an event such as "emergency alert button is pressed" is detected, only a vehicle in which an emergency alert button has been pressed is a monitoring target vehicle; and recorded audio data is obtained. Therefore, image information and audio information, which are recorded respectively in the temporary image memory 21 and the temporary audio memory 22 for 3 minutes before the occurrence of an event and for 5 minutes after the occurrence of an event, are recorded in the image memory 23 and the audio memory 24, respectively. In the second example, it is possible that data is recorded only during a period in which audio from a person who has notified an emergency is detected.

As the third example, when an event such as "emergency brake is applied" is detected, all vehicles are monitoring target vehicles, recorded audio data is unnecessary, and information before the occurrence of an event is unnecessary. Therefore, image information recorded in the temporary image memory 21 for 1 minute after the occurrence of an event is recorded in the image memory 23.

It is preferable that the period for obtaining the image information and audio information recorded in the manner as described above is varied and also that the monitoring target vehicles are varied, according to the type of event; because this can increase the efficiency in memory-usage.

The train interior monitoring method of the present embodiment described above is a train interior monitoring method for monitoring an interior of a train and recording information in a monitoring-information recording device provided with a temporary memory and a memory. The method includes a step for obtaining image information including time data by a camera; a step for obtaining audio information including time data by a microphone; a step for, by the monitoring-information recording device, temporarily recording data containing the image information from the camera to a temporary image memory; a step for, by the monitoring-information recording device, temporarily recording data containing the audio information from the microphone to a temporary audio memory; a step for, by the monitoring-information recording device when an event occurs, recording data containing the image information having been recorded in the temporary image memory, in the image memory without processing to reduce a file size for only a period before and after detection of an occurrence of the event, which is set according to the event, and recording data containing the audio information having been recorded in the temporary audio memory in an audio memory for only a period before and after detection of an occurrence of the event, which is set according to the event; a step for, by the monitoring-information recording device, processing data containing the image information having been recorded in the temporary image memory to reduce its file size, and recording the processed data in the image memory after a lapse of a given period; and a step for, by the monitoring-information recording device, discarding data containing the image information in the temporary image memory and the temporary audio memory.

Furthermore, in order to execute the train interior monitoring method described above, the CPU 20 may execute a program for the train interior monitoring method described above.

Further, a train interior monitoring system can be configured by applying the train interior monitoring method described above thereto. The train interior monitoring system of the present embodiment is a train interior monitoring system that includes a camera that monitors an interior of a train and obtains image information; a microphone that obtains audio information; and a monitoring-information recording device that includes a temporary image memory in which the image information is temporarily recorded, an image memory in which a portion of data in the temporary image memory is saved, a temporary audio memory in which the audio information is temporarily recorded, and an audio memory in which a portion of data in the temporary audio memory is saved. After a lapse of a given period, the monitoring-information recording device processes data containing the image information having been recorded in the temporary image memory to reduce its file size, and records the processed data in the image memory; and when an event occurs, the monitoring-information recording device records data containing the image information having been recorded in the temporary image memory in the image memory without processing the data for only a period of time before and after detection of an occurrence of the event, the period of time being set according to the event; and also records data containing the audio information having been recorded in the temporary audio memory in the audio memory for only a period of time before and after detection of an occurrence of the event, the period of time being set according to the event. The data containing the image information in the temporary image memory and data containing the audio information in the temporary audio memory are discarded after having been recorded respectively to the memories.

As described in the present embodiment, the present invention can provide a train interior monitoring system that is capable of obtaining image information before and after the occurrence of an event, which increases the efficiency in memory-usage.

INDUSTRIAL APPLICABILITY

As described above, the train interior monitoring method and the train interior monitoring system according to the present invention are useful in trains including monitoring cameras.

REFERENCE SIGNS LIST 10, 10a monitoring-information recording device, 11 vehicle-information management device, 12 master controller, 13 brake device, 14 broadcasting device, 15-1, 15-2, . . . , 15-n vehicle, 16, 16-1a, 16-1b, 16-2a, . . . , 16-nb monitoring camera, 17, 17-1, 17-2a, 17-2b, . . . , 17-nb emergency alerting device, 20 CPU, 21 temporary image memory, 22 temporary audio memory, 23 image memory, 24 audio memory, S1 to S8, S11 to S16 step.

The invention claimed is:

1. A train interior monitoring method for monitoring an interior of a train and recording information in a monitoring-information recording device that is provided with a temporary memory and a memory, the method comprising:
 a step for obtaining image information by using a camera;
 a step for, by using the monitoring-information recording device, temporarily recording data containing the image information from the camera in the temporary memory;
 a step for, by using the monitoring-information recording device when an event occurs, recording, for a period of time before and after detection of the event, the data containing the image information which has already been recorded in the temporary memory, in the memory without processing in order to reduce a file size of the data containing the image information, the period of time being set according to what the event is;
 a step for, by using the monitoring-information recording device, after a given period of time has elapsed,
  processing the front half of the data containing the image information, which has been recorded in the temporary memory, in order to reduce the file size of the data containing the image information, and recording the processed data in the memory; and
 a step for, by using the monitoring-information recording device, discarding the front half of the data containing the image information held in the temporary memory, which corresponds to the front half of the data containing the image information that has been recorded in the memory.

2. The train interior monitoring method according to claim 1, wherein
 the processing to reduce a file size is a conversion to a low frame rate.

3. The train interior monitoring method according to claim 1, wherein
 the processing to reduce a file size is a conversion from moving-image data to still-image data.

4. The train interior monitoring method according to claim 1, wherein
 the processing to reduce a file size is a compression of a file.

5. The train interior monitoring method according to claim 1, wherein
 the processing to reduce a file size is a reduction in resolution.

6. The train interior monitoring method according to claim 1, wherein the processing to reduce a file size is a deletion of a portion of data.

7. A train interior monitoring method for monitoring an interior of a train and recording information in a monitoring-information recording device that is provided with a temporary memory and a memory, the method comprising:
a step for obtaining, by using a camera, image information that includes time data;
a step for obtaining, by using a microphone, audio information that includes time data;
a step for, by using the monitoring-information recording device, temporarily recording data containing the image information from the camera in a temporary image memory;
a step for, by using the monitoring-information recording device, temporarily recording data containing the audio information from the microphone in a temporary audio memory;
a step for, by using the monitoring-information recording device when an event occurs,
recording, for only a period of time before and after detection of the event, the data containing the image information, which has been recorded in the temporary image memory, in the image memory without processing in order to reduce a file size of the data containing the image information, the period of time being set according to what the event is, and
recording, for only a period of time before and after detection of the event, data containing the audio information, which has been already recorded in the temporary audio memory, in an audio memory, the period of time being set according to what the event is;
a step for, by using the monitoring-information recording device, after a given period of time has elapsed,
processing the front half of the data containing the image information, which has been recorded in the temporary image memory, to reduce a file size of the data containing the image information, and
recording the processed data in the image memory; and
a step for, by using the monitoring-information recording device, discarding the front half of the data containing the image information held in the temporary image memory and in the temporary audio memory, which corresponds to the front half of the data containing the image information that has been recorded in the memory.

8. The train interior monitoring method according to claim 7, wherein
the processing to reduce a file size is a conversion to a low frame rate.

9. The train interior monitoring method according to claim 7, wherein
the processing to reduce a file size is a conversion from moving-image data to still-image data.

10. The train interior monitoring method according to claim 7, wherein
the processing to reduce a file size is a compression of a file.

11. The train interior monitoring method according to claim 7, wherein
the processing to reduce a file size is a reduction in resolution.

12. The train interior monitoring method according to claim 7, wherein
the processing to reduce a file size is a deletion of a portion of data.

13. A train interior monitoring system comprising:
a camera that monitors an interior of a train and obtains image information; and
a monitoring-information recording device that includes a temporary memory in which the image information is temporarily recorded and a memory in which a portion of data in the temporary memory is saved, wherein
the monitoring-information recording device, after a given period of time has elapsed,
processes the front half of the data containing the image information, which has been recorded in the temporary memory, to reduce a file size the data containing the image information, and
records the processed data in the memory,
the monitoring-information recording device, when an event occurs, records, for only a period of time before and after detection of the event, data containing the image information, which has been recorded in the temporary memory, in the memory without processing the data containing the image information, the period of time being set according to what the event is, and
the front half of the data containing the image information in the temporary memory, which corresponds to the front half of the data containing the image information that has been recorded in the memory, is discarded after having been recorded in the memory.

14. The train interior monitoring system according to claim 13, wherein
the processing to reduce a file size is a conversion to a low frame rate.

15. The train interior monitoring system according to claim 13, wherein
the processing to reduce a file size is a conversion from moving-image data to still-image data.

16. The train interior monitoring system according to claim 13, wherein
the processing to reduce a file size is a compression of a file.

17. The train interior monitoring system according to claim 13, wherein
the processing to reduce a file size is a reduction in resolution.

18. The train interior monitoring system according to claim 13, wherein
the processing to reduce a file size is a deletion of a portion of data.

19. A train interior monitoring system comprising:
a camera that monitors an interior of a train and obtains image information;
a microphone that obtains audio information; and
a monitoring-information recording device that includes
a temporary image memory in which the image information is temporarily recorded,
an image memory in which a portion of data in the temporary image memory is saved,
a temporary audio memory in which the audio information is temporarily recorded, and
an audio memory in which a portion of data in the temporary audio memory is saved, wherein
the monitoring-information recording device, after a given period of time has elapsed,
processes data containing the image information, which has been recorded in the temporary image memory, to reduce its file size, and
records the processed data in the image memory, and
the monitoring-information recording device, records, when an event occurs, for only a period of time before and after detection of the event, data containing the image information, which has been recorded in the temporary image memory, in the image memory without processing the data containing the image information, the period of time being set according to what the event is, and also records, for only a period of time before and after detection of the event, data containing the audio information, which has been recorded in the temporary audio memory, in the audio memory, the period of time being set according to what the event is, and the monitoring-information recording device, after both of the data containing the image information and the data containing the audio information have been recorded respectively in the memories, discards the front half of the data containing the image information in the temporary image memory and the data containing the audio information in the temporary audio memory, the front half of the data corresponding to the data that has been recorded in the memory.

20. The train interior monitoring system according to claim 19, wherein
the processing to reduce a file size is a conversion to a low frame rate.

21. The train interior monitoring system according to claim 19, wherein
the processing to reduce a file size is a conversion from moving-image data to still-image data.

22. The train interior monitoring system according to claim 19, wherein
the processing to reduce a file size is a compression of a file.

23. The train interior monitoring system according to claim 19, wherein
the processing to reduce a file size is a reduction in resolution.

24. The train interior monitoring system according to claim 19, wherein
the processing to reduce a file size is a deletion of a portion of data.

* * * * *